US012025936B2

(12) United States Patent
Saito et al.

(10) Patent No.: US 12,025,936 B2
(45) Date of Patent: Jul. 2, 2024

(54) FIXING APPARATUS FOR FIXING A TONER IMAGE ON A RECORDING MEDIUM

(71) Applicant: CANON KABUSHIKI KAISHA, Tokyo (JP)

(72) Inventors: Shutaro Saito, Tokyo (JP); Youichi Chikugo, Chiba (JP); Hidekazu Tatezawa, Saitama (JP); Rikiya Takemasa, Chiba (JP); Takeshi Kozuma, Tokyo (JP); Mikihiko Watanabe, Ibaraki (JP); Taku Ashida, Chiba (JP); Keisuke Yoshida, Chiba (JP); Yuya Yamada, Chiba (JP); Kenichi Tanaka, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/172,849

(22) Filed: Feb. 22, 2023

(65) Prior Publication Data

US 2023/0273559 A1 Aug. 31, 2023

(30) Foreign Application Priority Data

Feb. 28, 2022 (JP) ................................ 2022-028871

(51) Int. Cl.
*G03G 15/20* (2006.01)

(52) U.S. Cl.
CPC ..... *G03G 15/2053* (2013.01); *G03G 15/2025* (2013.01); *G03G 15/2064* (2013.01); *G03G 2215/2032* (2013.01)

(58) Field of Classification Search
CPC .......... G03G 15/2017; G03G 15/2025; G03G 15/2053; G03G 15/2064; G03G 2215/2032; G03G 2215/2093
See application file for complete search history.

(56) References Cited

U.S. PATENT DOCUMENTS

| | | | | |
|---|---|---|---|---|
| 2013/0243501 A1* | 9/2013 | Chiba | G03G 15/2053 399/329 |
| 2021/0141322 A1* | 5/2021 | Tatezawa | G03G 15/2053 |
| 2021/0191299 A1* | 6/2021 | Takemasa | G03G 15/2053 |
| 2023/0229102 A1* | 7/2023 | Yamaguchi | G03G 15/2064 399/69 |

FOREIGN PATENT DOCUMENTS

JP 2003195671 A 7/2003

* cited by examiner

*Primary Examiner* — Sophia S Chen
(74) *Attorney, Agent, or Firm* — CANON U.S.A., INC. IP Division

(57) ABSTRACT

A fixing apparatus includes a belt, a steering roller, a slide member, and a pressing rotation member that forms a nip portion by pressing the belt and is disposed to face the slide member. The belt applies heat to a recording material and has an inner circumferential surface that receives a lubricant applied onto the inner circumferential surface. The pressing rotation member fixes a toner image onto the recording material by applying heat and pressure to an unfixed toner image in the nip portion, in cooperation with the belt. An end portion of the belt on one end side in a belt width direction takes a position outside an end portion of the slide member on the one end side and a position inside the end portion of the slide member on the one end side while the steering roller is in operation.

14 Claims, 8 Drawing Sheets

FIXING APPARATUS FOR FIXING A TONER IMAGE ON A RECORDING MEDIUM

BACKGROUND

Field

The present disclosure relates to a fixing apparatus for fixing a toner image on a recording medium.

Description of the Related Art

An image forming apparatus includes a fixing apparatus for fixing an unfixed toner image on a recording material.

Some known fixing apparatuses have a heating roller including a heat source for heating an unfixed toner image, an endless rotatable belt to which heat is applied from the heating roller, and a pressure roller for pressing the belt, as discussed in Japanese Patent Application Laid-open No. 2003-195671. The heating roller is arranged on an inner circumferential surface of the belt to suspend the belt. The pressure roller is arranged on an outer circumferential surface of the belt to form a fixing nip portion in cooperation with the belt by pressing a pad member via the belt. A recording material with an unfixed toner image borne thereon is conveyed to a nip portion to be nipped and conveyed in the nip portion, and then heat and pressure are applied to the recording material to fix the toner on the recording material.

In the fixing apparatus using the above-described belt, it is known that a steering control is performed for adjusting a position of the belt in a width direction. By performing the steering control, scratches caused by an edge portion of the recording material are prevented. Further, the steering control prevents the belt from coming off from members suspending the belt.

Along with the speeding up of the image forming apparatus in printing speed, a fixing apparatus having a fixing nip portion with an increased width in a conveyance direction of the recording material is proposed. It is advantageous to increase the fixing nip width for the speeding up in printing. On the other hand, the sliding friction between the pad member and the belt increases by increasing the fixing nip width. To address this, in known techniques, the sliding resistance is reduced by applying a lubricant to the inner circumferential surface of the belt and by using a slide member to improve the slidability between the belt and the pad member.

The belt is shorter than the slide member in the width direction. Accordingly, oil that has leaked out from the belt inner circumferential surface adheres to the slide member located outside the belt. This may lead the oil adhering to the slide member to adhere to the outer circumferential surface of the belt, along with the execution of the steering control. Thereafter, the oil adhering to the outer circumferential surface of the belt is transferred to the recording material, which leads to the degradation in image quality.

SUMMARY

The present disclosure is directed to a fixing apparatus that prevents the degradation in the image quality caused by the oil transferred to the recording material.

According to an aspect of the present disclosure, a fixing apparatus includes a rotatable endless belt configured to apply heat to a recording material, a steering roller, in contact with an inner circumferential surface of the rotatable endless belt, configured to change a position of the rotatable endless belt in a width direction of the rotatable endless belt by swinging, a slide member, in contact with the inner circumferential surface of the rotatable endless belt, configured to slide onto the inner circumferential surface of the rotatable endless belt, and a pressing rotation member disposed to face the slide member via the rotatable endless belt, and configured to form a nip portion by pressing the rotatable endless belt, wherein the pressing rotation member is configured to fix a toner image onto the recording material by applying heat and pressure to an unfixed toner image in the nip portion, in cooperation with the rotatable endless belt, wherein the inner circumferential surface of the rotatable endless belt is configured to receive a lubricant applied onto the inner circumferential surface, and wherein an end portion of the rotatable endless belt on one end side in the width direction is configured to take a position outside an end portion of the slide member on the one end side and a position inside the end portion of the slide member on the one end side while the steering roller is in operation.

Further features of the present disclosure will become apparent from the following description of exemplary embodiments with reference to the attached drawings.

DESCRIPTION OF THE EMBODIMENTS

Hereinbelow, exemplary embodiments of an image forming apparatus according to the present disclosure will be described with reference to the accompanying drawings. Hereinbelow, examples in which the present disclosure is applied to a full color electrophotographic type image forming apparatus including a plurality of photosensitive drums will be described. The present disclosure is however not limited thereto, and is applicable to, for example, a single color image forming apparatus. In an example, a fixing apparatus includes a rotatable endless belt, a steering roller, a slide member, and a pressing rotation member. A lubricant is applied onto the inner circumferential surface of the belt. An end portion of the belt on one end side in the width direction is configured to take a position outside an end portion of the slide member on the one end side and a position inside the end portion of the slide member on the one end side while the steering roller is in operation.

<Image Forming Apparatus>

A schematic configuration of an image forming apparatus 100 according to an exemplary embodiment will be described with reference to FIG. 1.

Figure 1:
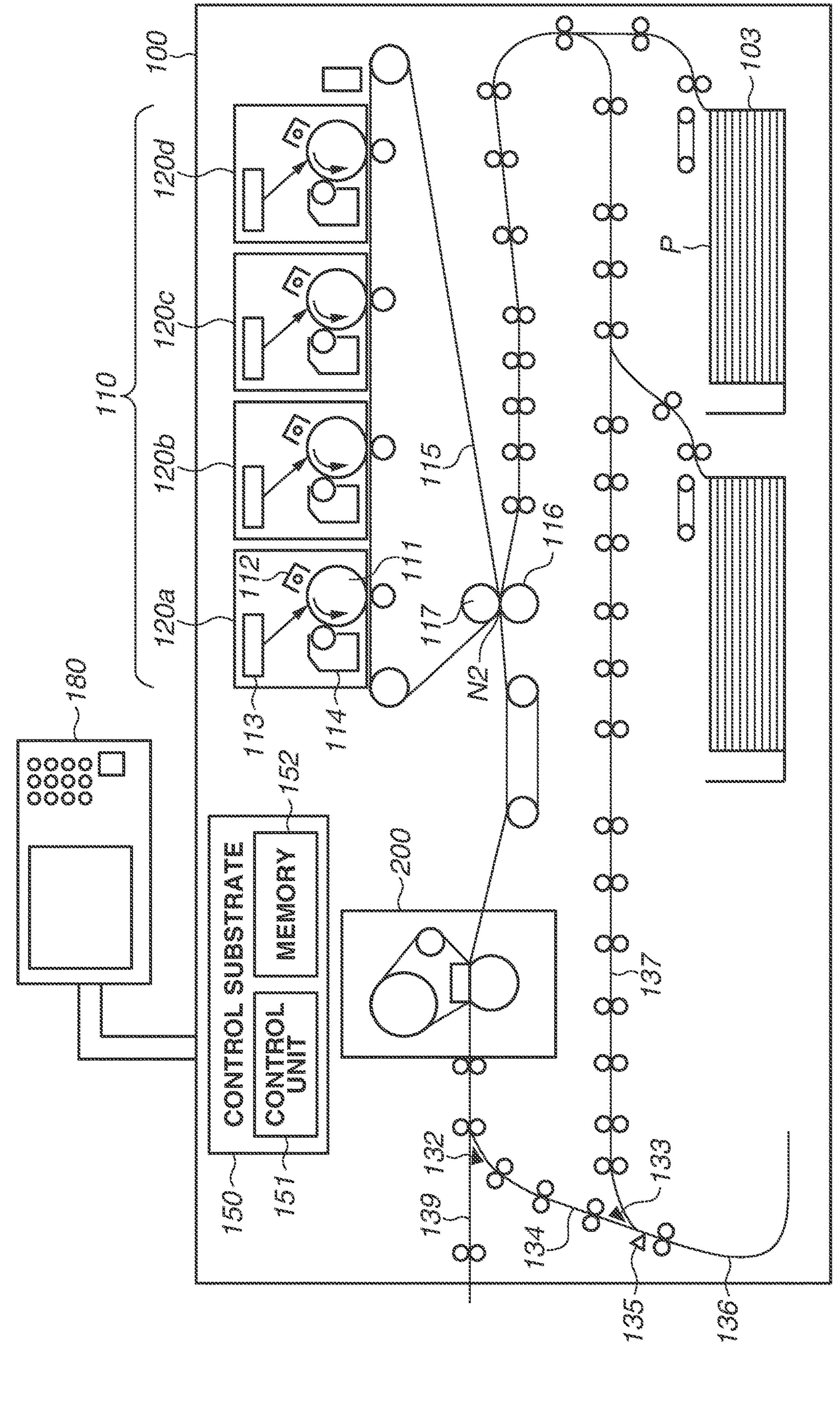
FIG. 1 is a section diagram schematically illustrating an image forming apparatus according to an exemplary embodiment.

FIG. 1 is a section diagram schematically illustrating the configuration of the full color image forming apparatus 100 according to the present exemplary embodiment. The image forming apparatus 100 includes four types of image forming units 110 including an image forming unit 120*a* for yellow, an image forming unit 120*b* for magenta, an image forming unit 120*c* for cyan, and an image forming unit 120*d* for black, along the moving direction of an intermediate transfer belt 115. A process of forming a toner image on the intermediate transfer belt 115 will be initially described using the image forming unit 120*a* for yellow as an example.

In FIG. 1, a charging unit 112 uniformly charges the surface of a photosensitive drum 111 which is rotationally driven (such a process is also referred to as electrostatic charge). An exposure device 113 then applies a laser beam to the surface of the photosensitive drum 111 based on input image data to form an electrostatic latent image on the surface of the photosensitive drum 111 (such a process is also referred to exposure). A development unit 114 then forms a yellow toner image on the photosensitive drum 111. A primary transfer roller 117 applies to the intermediate transfer belt 115 a voltage with a polarity opposite to the polarity of the yellow toner image. This transfers the yellow toner on the photosensitive drum 111 onto the intermediate transfer belt 115 (primary transfer). The yellow toner remaining on the surface of the photosensitive drum 111 without being transferred to the intermediate transfer belt 115 is scraped off by a toner cleaner and removed from the surface of the photosensitive drum 111. The series of processes are performed in a similar manner by the image forming unit 120*b* for magenta, the image forming unit 120*c* for cyan, and the image forming unit 120*d* for black. Thus, a full color toner image is formed on the intermediate transfer belt 115.

The toner image on the intermediate transfer belt 115 is conveyed to a secondary transfer portion N2 formed by a secondary transfer roller pair 116. A recording material P is taken out from a recording material cassette 103 one by one in synchronization with a timing at which the toner image is conveyed and fed to the secondary transfer portion N2. The toner image on the intermediate transfer belt 115 is then transferred onto the recording material P (secondary transfer).

The recording material P with the toner image transferred thereon is conveyed to a fixing apparatus 200 to be fixed by receiving heat and pressure by the fixing apparatus 200. The recording material P with the toner image fixed thereon is discharged to a discharge tray.

The image forming apparatus 100 can also form a monochrome image. In the monochrome image formation, only the image forming unit 120*d* for black is driven among the plurality of image forming units 110.

In a case where image forming is performed on both surfaces of the recording material P, after the toner transfer and fixing on an image forming first surface (first surface) is completed, the recording material P after fixing is guided to a conveyance path 134 by a flapper 132 provided in the image forming apparatus 100. The recording material P is then conveyed to a reversing portion 136.

In a reverse sensor 135 detects the rear end of the recording material P, a flapper 133 switches the conveyance direction of the recording material P to a reversing path 137. The image forming apparatus 100 conveys the reversed recording material P to the image forming units 110 and to the fixing apparatus 200 again, through the reversing path 137. The recording material P for which the printing on both surfaces is completed is guided to a discharge path 139 by the flapper 132, and discharged outside.

The processes beginning from the electrostatic charging to the discharging of the recording material P with the toner image fixed thereon to the discharge tray is referred to as “image forming processing” (print job). In addition, the period during which the image formation is performed is referred to as “an image forming processing being performed” (print job being performed).

An operation unit 180 includes a display screen and selection keys. The operation unit 180 displays a state of the image forming apparatus 100 on the display screen and receives an operation instruction from an operator (user) with the selection keys.

A control substrate 150 includes a control unit 151 and a memory 152, and controls each unit in the image forming apparatus 100 described above. The control unit 151 outputs an output signal to each electric component to operate the electric component at a desired timing and a required control amount, based on detection signals input from various sensors and information stored in the memory 152. Thus, it is the control unit 151 to actually control the electric components. The memory 152 stores information data to be used to control each unit, and the control unit 151 reads and writes the information data stored in the memory 152.

<Fixing Apparatus>

Figure 2:
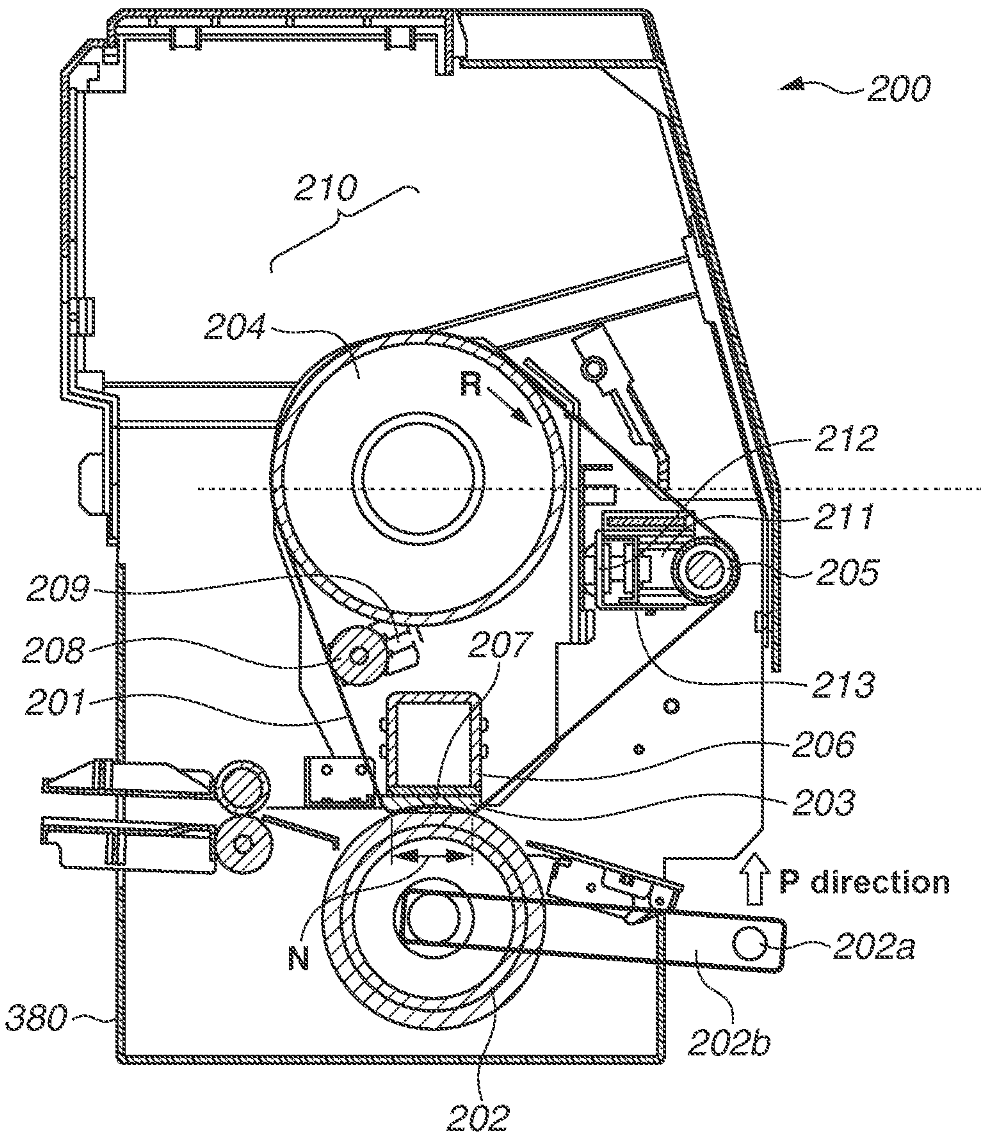
FIG. 2 is a section diagram schematically illustrating a fixing apparatus according to the exemplary embodiment.
Figure 3:
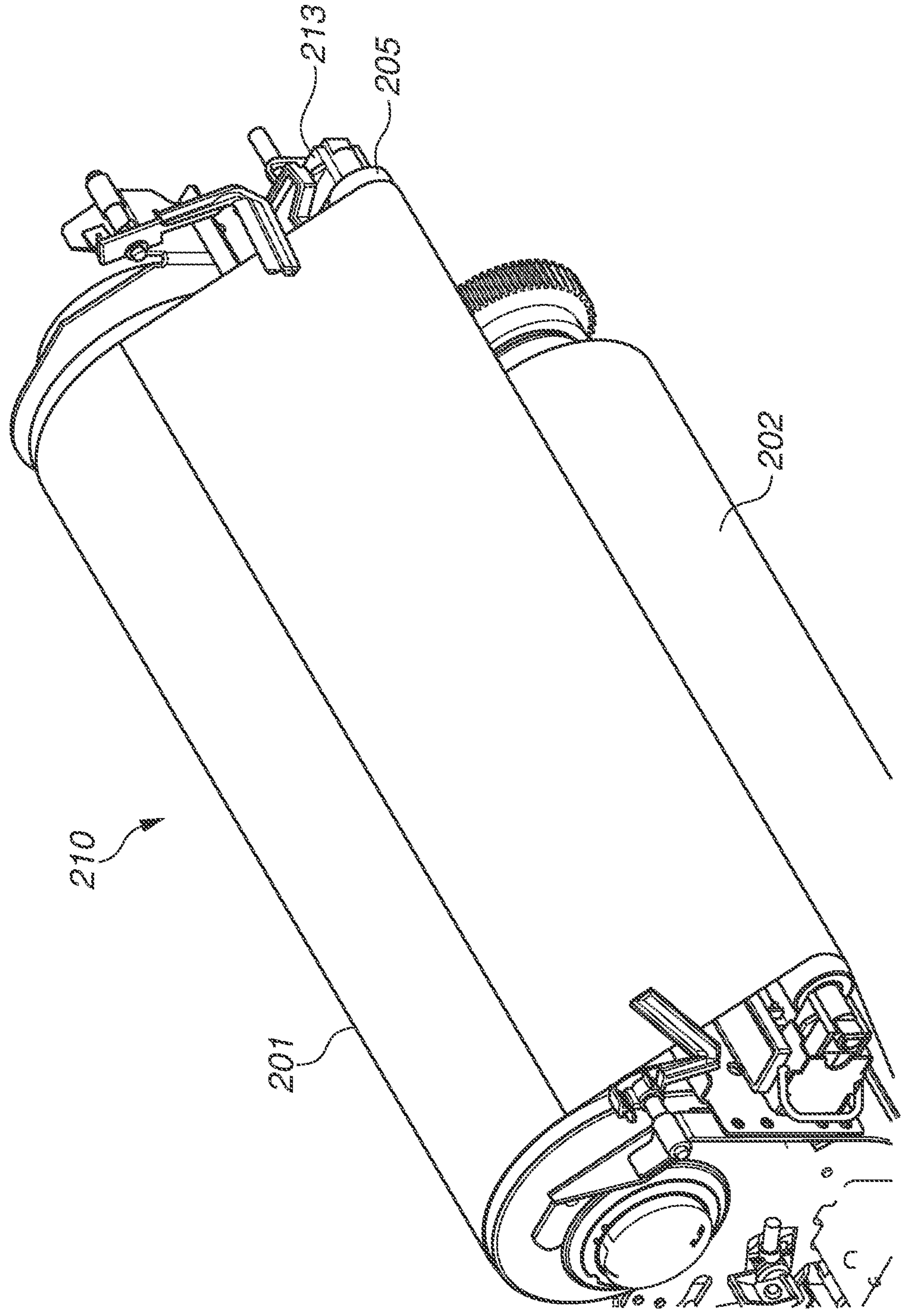
FIG. 3 is a perspective view illustrating the fixing apparatus according to the exemplary embodiment.

Next, with reference to FIGS. 2 and 3, a configuration of the fixing apparatus 200 according to the present exemplary embodiment will be described in detail. FIG. 2 is a section diagram of the fixing apparatus 200 according to the present exemplary embodiment, and FIG. 3 is a partial perspective view of the fixing apparatus 200. The overall configuration of the fixing apparatus 200 based on a belt heating method according to the present exemplary embodiment is schematically illustrated in FIG. 2. In FIG. 2, the recording material P is conveyed from the right to the left in FIG. 2. The fixing apparatus 200 includes a heating unit 210 including a heat source, and a pressing rotation member (hereinbelow, referred to as a pressure roller) 202 that forms a fixing nip portion N with the heating unit 210. The heating unit 210 includes a fixing belt (hereinbelow, referred to as a belt) 201 that is a rotatable endless heating rotation member, a pad member (hereinbelow, referred to as a pad) 203 serving as a fixing member, a heating roller 204, and a steering roller 205.

The belt 201 is excellent in thermal conductivity and heat resistance, and has a thin-wall hollow cylindrical shape. In the present exemplary embodiment, the belt 201 has a three-layer structure including a base layer, an elastic layer around the outer periphery of the base layer, and a release layer around the elastic layer. The base layer is 60 μm in thickness and a material thereof is polyimide (PI) resin. The elastic layer is 300 μm in thickness and includes silicone rubber. The release layer is 30 μm in thickness and includes perfluoroalkoxy (PFA) (tetrafluoroethylene-perfluoroalkoxy ethylene copolymer resin) which is fluororesin. The belt 201 is stretched around the pad 203, the heating roller 204, and the steering roller 205.

The pad 203 presses and contacts the pressure roller 202 via the belt 201 to form the fixing nip portion N having a predetermined width in a recording material conveyance direction. The pad 203 has a nearly rectangular shape in section, and long in a width direction of the belt 201. The material of the pad 203 is to have the heat resistance property, and thus liquid crystalline polymer (LCP) resin is used.

A slide member 207 and silicone oil S (hereinbelow, referred to as oil S) serving as a lubricant are provided between the pad 203 and the belt 201, and the belt 201 is slidable smoothly with respect to the pad 203.

An oil supply roller 208 is formed by the silicone oil impregnating to a roll shape member formed by winding an unwoven cloth with 100 μm in thickness. The oil supply roller 208 is brought into contact with the inner surface of the belt 201 with a force of 3.0 N by a pressing spring 209, and supported by a frame of the heating unit 210 to be rotatably driven.

The oil S applied between the pad 203 and the belt 201 as a lubricant becomes degraded with operations of the fixing apparatus 200 and reduces due to the leak to the outside. If the oil S between the pad 203 and the belt 201 becomes unable to be held, the sliding resistance between the pad 203 and the belt 201 increases, and an issue such as a driven rotation defect of the belt 201 may occur. Supply of the oil to the inner circumferential surface of the belt 201 is enabled by the oil supply roller 208 contacting the inner surface of the belt 201. This enables the oil S to be held longer between the belt 201 and the pad 203 (slide member 207), thus keeping the stable operation of the fixing apparatus 200. The fixing apparatus 200 according to the present exemplary embodiment includes the oil supply roller 208, but may be configured in such a manner that the oil S is applied onto the inner circumferential surface of the belt 201 in the process of manufacturing the fixing apparatus 200. In other words, the fixing apparatus 200 may exclude the oil supply roller 208.

A stay 206 is arranged on an inner side of the belt 201. The stay 206 is arranged on an opposite side on which the slide member 207 is disposed, in other words, the stay 206 is disposed on the inner side of the pad 203. The stay 206 is a reinforcing member supporting the pad 203, having rigidity, and is long in the width direction of the belt 201.

A drawn material of stainless steel SUS 304 with a thickness of 3 mm is used as a material of the stay 206, and the stay 206 is formed with a hollow square shape in the transverse section, thus ensuring a strength. When the pad 203 is pressed by the pressure roller 202, the stay 206 ensures the pressing force in the fixing nip portion N by strength being given to the pad 203. The material of the stay 206 is not limited to the stainless steel, as long as the strength of the material can be ensured.

The heating roller 204 is a stainless steel pipe with a thickness of 1 mm, and a halogen heater (not illustrated) is disposed inside the heating roller 204 thus generating heat to a predetermined thermometer. The belt 201 is heated by the heating roller 204, and controlled at a target temperature predetermined depending on a paper type based on a temperature detected by a thermistor. The heating roller 204 may be configured to be rotationally driven. The heating roller 204 is rotationally driven, thus enabling increase in the tensile force of the belt 201 from the fixing nip portion N to the heating roller 204 in a belt rotation direction. This increases the curvature of the exit portion of the fixing nip portion N in the belt rotation direction, so that the separation performance of the recording material P is increased.

Figure 4:
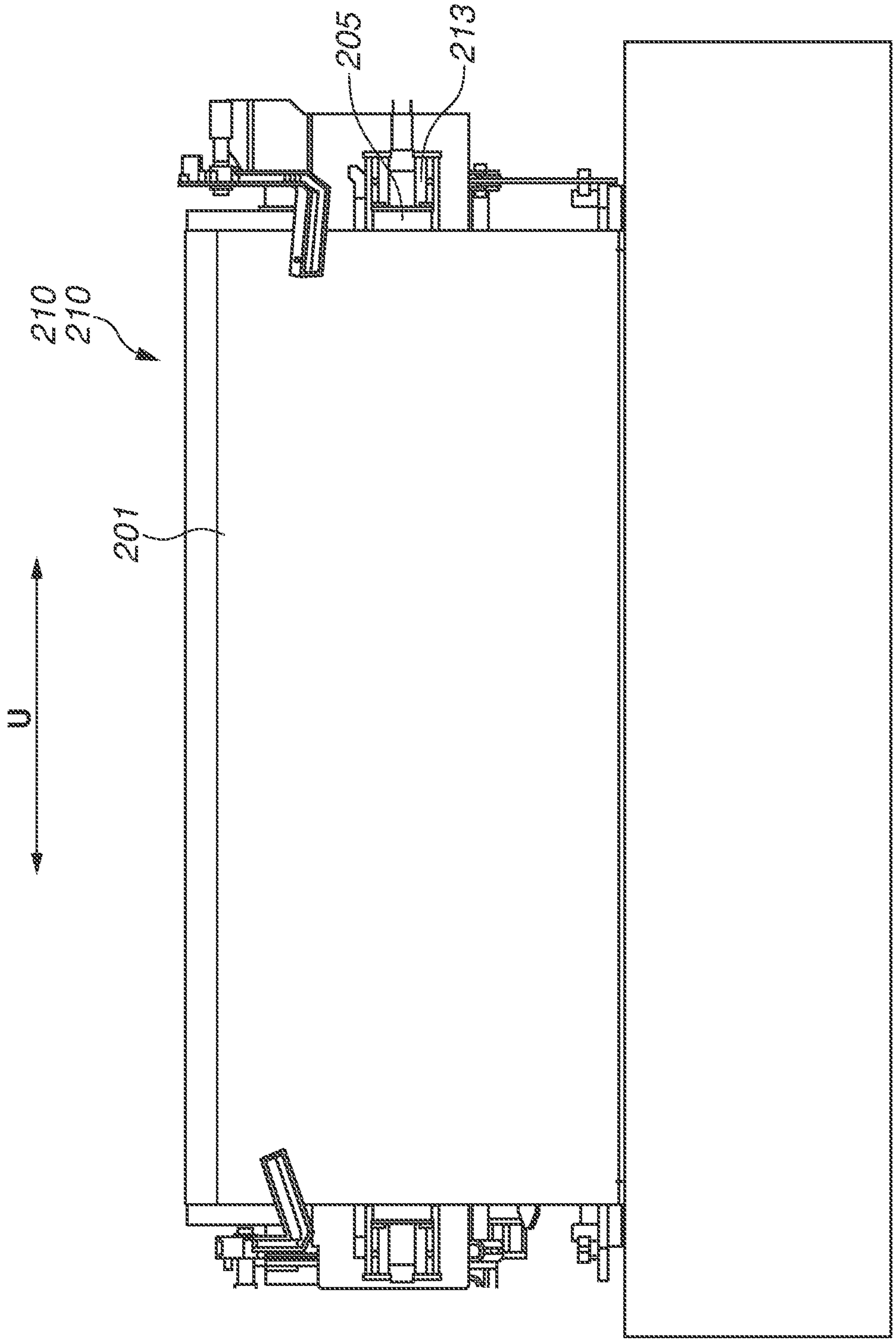
FIG. 4 is a diagram illustrating the fixing apparatus according to the exemplary embodiment viewed from a conveyance direction.

The steering roller 205 suspends the belt 201 and is supported by a steering frame 213. The steering roller 205 changes the alignment with respect to the other suspending members by the steering frame 213 rotating with a rotation shaft 212 as a supporting point with respect to the frame of the heating unit 210. This generates a difference in tension of the belt 201 between preceding and following portions. Then, as illustrated in FIG. 4, the position of the belt 201 is controlled in the width direction of the belt 201 by the belt 201 being moved in a U direction. The steering roller 205 is urged by a spring 211 supported by the steering frame 213, and also has a role of a tension roller providing a predetermined tension to the belt 201.

The steering roller 205 also has a role of reducing the gloss unevenness caused by the edge portion of the recording material P. In the present exemplary embodiment, a force of approximately 2000 N is applied to the belt 201 in the fixing nip portion N. When the unfixed toner is fixed onto the recording material P, a larger stress is applied to the part of the recording material P at which the belt 201 contacts the edge portion of the recording material P, than that at which the belt 201 does not contact the edge portion. The area through which the edge portion of the recording material P has passed many times changes to have a depressed shape compared with the edge portion non-contact area. The depressed portion generated on the surface of the belt 201 caused by the edge portion of the recording material P is referred to as a "paper edge scratch".

When the unfixed toner is fixed onto the recording material P, the fixing apparatus 200 applies pressure and heat to the recording material P. At this time, the surface state of the belt 201 is reflected on the gloss of the image surface after being fixed. If the surface of the belt 201 has unevenness, the unevenness state is reflected on the gloss of the image surface, and thus, the gloss unevenness occurs on the image surface. Thus, if the unfixed toner is fixed on the recording material P in a state where the surface of the belt 201 has a paper edge scratch, a linear gloss unevenness occurs on the image surface. To address this, in the present exemplary embodiment, the belt 201 is moved reciprocally in the width direction to control the paper edge scratch on the surface of the belt 201.

The fixing apparatus 200 according to the present exemplary embodiment includes a position detection unit (not illustrated) for detecting the position of the belt 201 in the width direction. Provided is an arm that is brought into contact with an end portion of the belt 201 in a direction from the outside to the inside of the belt 201 in the width direction. The position of the arm is detected by a sensor, such as a photointerrupter, thus detecting the position of the belt 201 in the width direction. To detect the position of the belt 201 in the width direction accurately, the arm applies the force to the belt 201 from the outside to the inside of the belt 201 in the width direction. To apply the force in this direction, the rotation shaft of the arm is in a direction orthogonal to the width direction. Thus, the arm for detecting the position of the belt 201 in the width direction rotates about this rotation shaft in the width direction. Detecting the position of the belt 201 in the width direction enables the belt 201 to be prevented from coming off from the members suspending the belt 201, such as the pad 203, the heating roller 204, and the steering roller 205. Further, to prevent the paper edge scratch, the belt 201 can be actively moved in the width direction.

The pressure roller 202 is a roller including an elastic layer around the outer periphery of the shaft, and a release layer around the outer periphery of the elastic layer. The shaft is made of stainless steel, the elastic layer is 5 mm in thickness and made of conductive silicone rubber, and the release layer is 50 μm in thickness and made of PFA serving as fluororesin. The pressure roller 202 is axially supported by a fixing frame 380 of the fixing apparatus 200, a gear is fixed to one end of the pressure roller 202, and the pressure roller 202 is connected, via the gear, to a drive source M to be rotationally driven. The belt 201 is rotationally driven in an R direction by being sandwiched by the rotating pressure roller 202 and the pad 203.

<Contacting and Separating Mechanism>

The contacting and separating mechanism of the pressure roller 202 will be described. The pressure roller 202 is movable between a position at which the pressure roller 202 is brought into contact with the belt 201 and a position at which the pressure roller 202 separates from the belt 201 with the contacting and separating mechanism. The contacting and separating mechanism includes a pressing frame **202*b* and a drive motor. The pressing frame 202*b* supports the pressure roller 202. The pressing frame 202*b* receives a driving force from the drive motor and rotates with a pressing rotation shaft 202*a* serving as a rotation axis. In response to the pressing frame 202*b* being rotated with the pressing rotation shaft 202*a* serving as the rotation axis in a clockwise direction on FIG. 2 by the drive motor, the pressure roller 202 moves in an arrow P direction. Thus, the pressure roller 202 is brought into contact with the pad 203 with the belt 201 therebetween (contact state) in a direction perpendicular to the conveyance direction of the recording material P, that is, a pressing direction. Thus, the fixing nip portion N is formed. When the pressing frame 202*b* is rotated with the pressing rotation shaft 202*a* as the rotation axis in a counterclockwise direction on FIG. 2, the pressure roller 202 becomes a state of separating from the belt 201** (separating state).

In this way, the pad 203, the heating roller 204, and the steering roller 205 are disposed on the inner circumferential surface of the belt 201 to suspend the belt 201. The belt 201 is nipped by the pressure roller 202 and the pad 203, and is rotationally driven by the rotational driving of the pressure roller 202. The belt 201 accumulates heat from the heating roller 204. When the recording material P on which the unfixed toner image is borne is nipped and conveyed by the pressure roller 202 and the belt 201 by the fixing nip portion N, heat and pressure to be used for fixing is applied. The toner image is then fixed onto the recording material P.

<Slide Member>

The fixing nip portion N is formed by the pressure roller 202 pressing the pad 203 via the belt 201. LCP resin is used as the material of the pad 203. The slide member 207 is disposed between the pad 203 and the belt 201.

In the fixing apparatus 200 according to the present exemplary embodiment, since the pressure applied to the fixing nip portion N is 1600 newton (N) and the nip width is 24.5 mm, the slide resistance between the belt 201 and the pad 203 stretching the belt 201 is large. To reduce the slide resistance, the slide member 207 that is slidable with respect to the belt 201 is disposed on the belt 201 side of the pad 203. Details thereof will be described below.

Figure 5A:
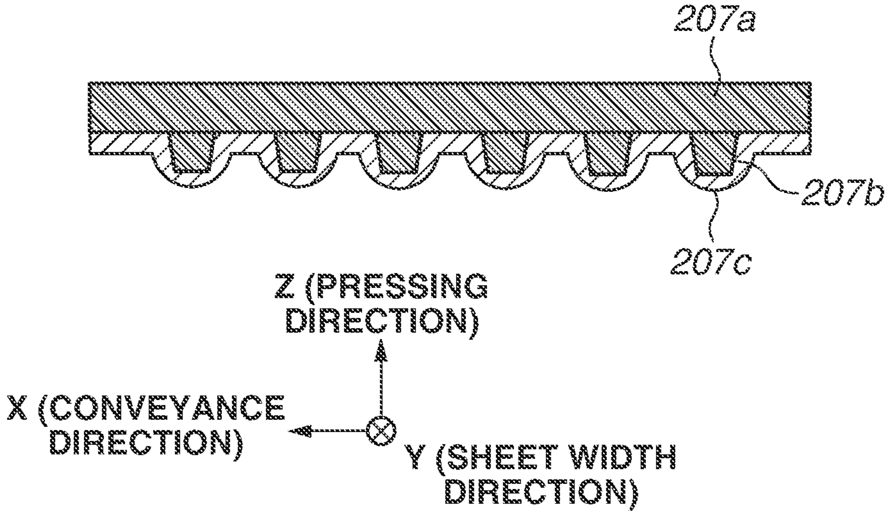
FIGS. 5A and 5B are diagrams schematically illustrating a slide member according to the exemplary embodiment.
Figure 5B:
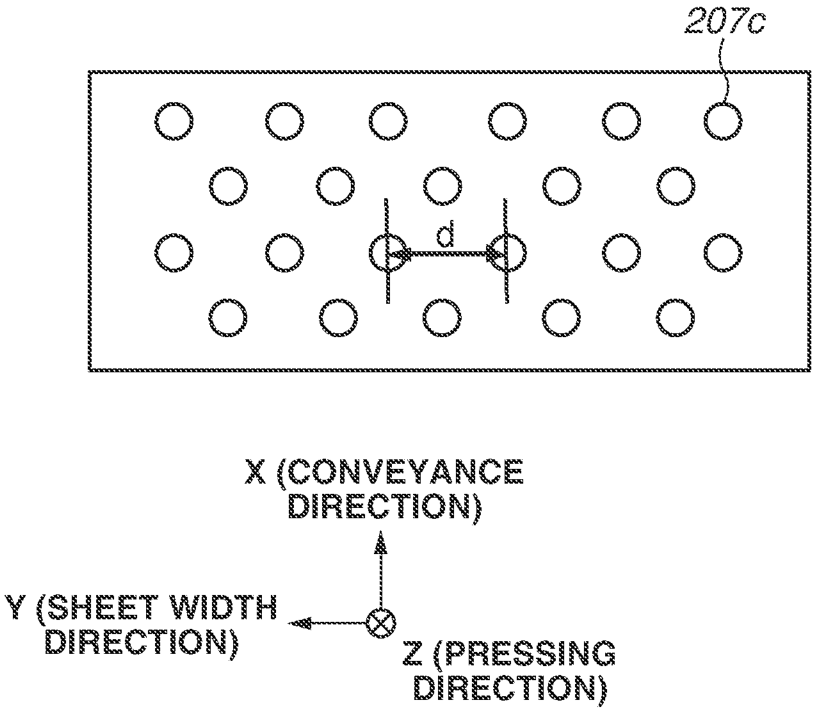

FIGS. 5A and 5B illustrate a detailed configuration of the slide member 207. FIG. 5A is a section diagram illustrating the slide member 207, with the side to side direction on FIG. 5A as the conveyance direction (X direction), and the up-and-down direction thereon as the pressing direction (Z direction). FIG. 5B is a diagram illustrating the slide member 207 viewed from the pressure roller 202, with the side to side direction on FIG. 5B as the width direction (Y direction), and the up-and-down thereon as the conveyance direction (X direction). The slide member 207 according to the present exemplary embodiment includes, as illustrated in 5A, a base material portion **207*a*, embossed portions 207*b* (protruding portions), and a sliding layer 207*c*. The base material portion 207*a* only needs to have a sufficient heat resistance and strength. The material of the base material portion 207*a* is desirably stainless steel, copper, aluminum, and engineering plastic, such as PI, polyetheretherketone (PEEK), and LCP. In the present exemplary embodiment, embosses are arranged at equal intervals of a distance d (1.4 mm) between the embosses (distance between the protrusions) on the slide member 207 in the width direction. By providing the embossed portions 207*b*, the contact area of the slide member 207 contacting the belt 201 can be reduced, thus reducing the slide resistance. In the present exemplary embodiment, the base material portion 207*a* and the embossed portions 207*b*** include stainless steel, which is a metal. However, the material thereof is not limited to stainless steel, and it is desirably a metal excellent in heating resistance and durability.

A material with which the low friction is realized, such as fluorine, polytetrafluoroethylene (PTFE), and PFA, is desirably provided on the sliding layer **207*c*. In the present exemplary embodiment, PTFE with a thickness of 20 μm is coated. As is described above, the frictional force between the inner circumferential surface of the belt 201 and the slide member 207 is extremely large. Further application of the lubricant onto the belt 201 enables the belt 201 to move smoothly with respect to the slide member 207**. As the lubricant described above, the silicone oil is used.

The slide member 207 according to the present exemplary embodiment covers the pad 203 both inside and outside of the fixing nip portion N. While it is not illustrated herein, part of the fixing nip portion N only needs to be covered by the slide member 207. In other words, the slide member 207 may be provided only in the fixing nip portion N.

In the present exemplary embodiment, the embossed portions **207*b* of the slide member 207 are provided in all area of the slide member 207. While it is not illustrated herein, part of the fixing nip portion N only needs to be covered by the embossed portions 207*b* of the slide member 207. In other words, the embossed portions 207*b* of the slide member 207 are disposed only in the fixing nip portion N. The embossed portions 207*b* provided in the fixing nip portion N are brought into contact with the belt 201 via the sliding layer 207*c***.

In the present exemplary embodiment, the configuration that the slide member 207 is fixed to the stay 206 is employed. While it is not illustrated herein, the slide member 207 and the pad 203 may be integrally configured in one unit. Part of the slide member 207 may be fixed to the stay 206 and/or the pad 203. For example, both ends in the Y direction (width direction) of the slide member 207 may be fixed to the pad 203 using screws or the like.

In the present exemplary embodiment, the pressing force applied to the fixing nip portion N is 1600 N, the length of the fixing nip portion N in the conveyance direction is 24.5 mm, and the length of the fixing nip portion N in the width direction is 326 mm.

<Image Quality Degradation Due to Lubricant>

The lubricant, or the oil S is used for the fixing apparatus 200 using the belt 201 as in the present exemplary embodiment. The oil S is applied onto the inner circumferential surface of the belt 201. In the fixing nip portion N, since the pressing force is generated by the pad 203 and the pressure roller 202, a force to push out the oil S applied onto the inner circumferential surface of the belt 201 from the inner circumferential surface of the belt 201 acts thereon.

In a case where the belt 201 is shorter than the slide member 207 and the pad 203 in the width direction, the pushed out oil S may possibly adhere to the outer circumferential surface of the belt 201 through the slide member 207 or the pad 203.

In the present exemplary embodiment, the belt 201 is moved reciprocally in the width direction using the steering roller 205. At that time, in a case where there is the oil S leaking out to an area outside the belt 201, the oil S may adhere noticeably to the outer surface of the belt 201. Since the belt 201 rotates in the R direction in FIG. 2, the oil S adhering to the outer surface of the belt 201 reaches the fixing nip portion N. If the oil S then adheres to the recording material P conveyed to the fixing nip portion N, the area to which the oil S adheres results in a defective image. To address this, the oil S is to be prevented from adhering to the area of the belt 201 in which the recording material P is brought into contact with the belt 201.

The oil S moves on from the inner circumferential surface of the belt 201 to irregularity portions provided on the slide member 207, and reaches the outer surface of the belt 201. Thus, the length of the belt 201 is made longer in the width direction than the area where the embossed portions 207*b* is provided, in the fixing apparatus 200 according to the present exemplary embodiment. Details thereof will be described below.

<Relationship in Length Between Belt and Slide Member>

Figure 6:
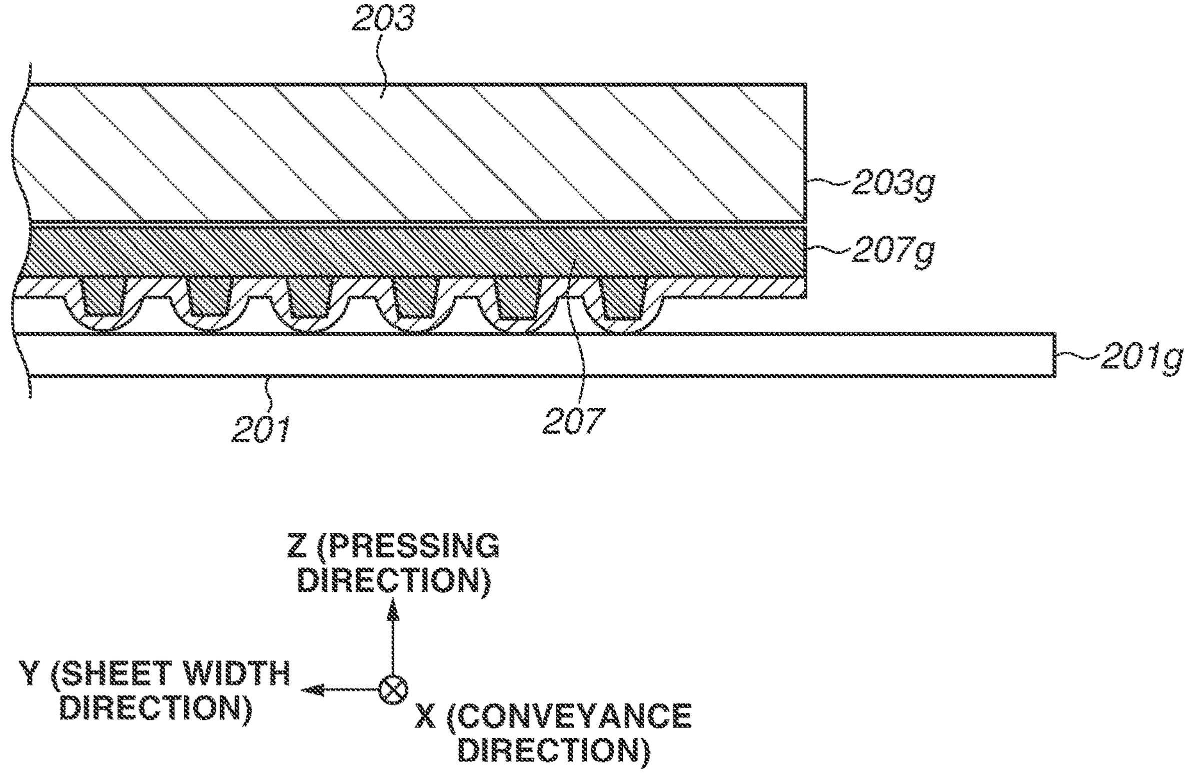
FIG. 6 is a diagram schematically illustrating a fixing nip portion including the slide member according to the exemplary embodiment.

With reference to FIG. 6, the relationship in length in the width direction between the belt 201 and the slide member 207 will be described. FIG. 6 is a diagram illustrating one end portion of the fixing apparatus 200 including the belt 201, the pad 203, and the slide member 207. The side-to-side direction on FIG. 6 is set to the sheet width direction. The other end portion has the same relationship, and a description thereof is omitted.

The slide member 207 has an area in which the embossed portions 207*b* are provided and an unembossed area 207*e* in which no embossed portion 207*b* is provided. The unembossed area 207*e* is disposed outside the area in the width direction in which the embossed portions 207*b* are provided.

As illustrated in FIG. 6, the belt 201 is longer in the width direction than the area included in the slide member 207 and in which the embossed portions 207*b* are provided.

The oil S applied between the inner circumferential surface of the belt 201 and the embossed portions 207*b* leaks out outside the area in which the embossed portions 207*b* are provided. However, the oil S that has leaked out outside the area in which the embossed portions 207*b* are provided does not easily reach the outer surface of the belt 201, because the length of the belt 201 is long in the width direction. Thus, the oil S can be held easily on the inner circumferential surface of the belt 201, so that the oil S is prevented from adhering to the outer surface of the belt 201.

The belt 201 and the pad 203 are in contact with each other at an exit portion of the fixing nip portion N. Thus, in a case where the oil S adheres to the pad 203, the oil S may adhere to the outer surface of the belt 201 by passing through the pad 203. For this reason, in the present exemplary embodiment, the belt 201 is made longer in the width direction than the pad 203 as illustrated in FIG. 6.

Figure 7:
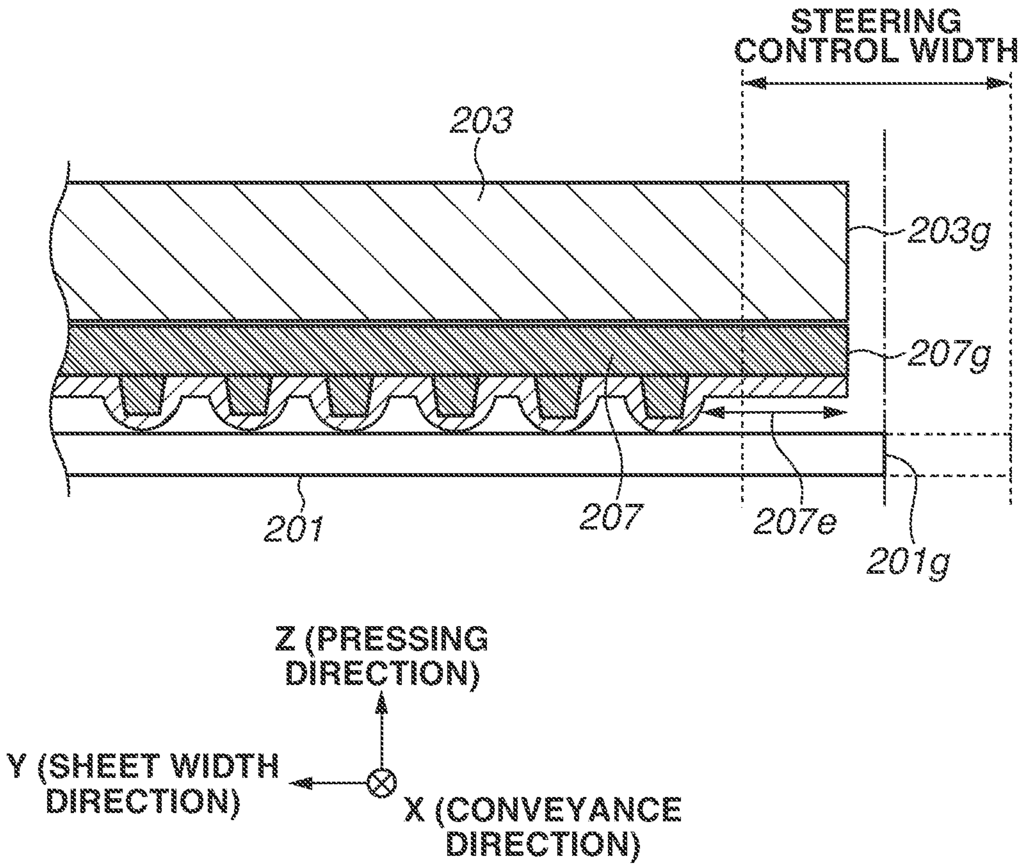
FIG. 7 is a diagram schematically illustrating a fixing nip portion including the slide member according to the exemplary embodiment.

In the present exemplary embodiment, the steering roller 205 is used. The position of an end portion 207*g* of the belt 201 is changed in the width direction by the steering roller 205. However, even in the case where the position of the end portion 207*g* of the belt 201 is changed by the steering roller 205 as illustrated in FIG. 7, the end portion 207*g* of the belt 201 is positioned outside the embossed portions 207*b* in the width direction. Thus, even in the fixing apparatus 200 including the steering roller 205, it is possible to prevent the oil S from adhering to the outer surface of the belt 201. In this configuration, the oil S that has leaked out from the embossed portions 207*b* accumulates in the unembossed area 207*e*. The oil S accumulated in the unembossed area 207*e* is, however, pulled back inside the belt 201 in the width direction due to the surface tension of the oil S. As a result, the oil S is supplied again from the unembossed area 207*e*, thus preventing the oil S from adhering to the outer surface of the belt 201.

Figure 8:
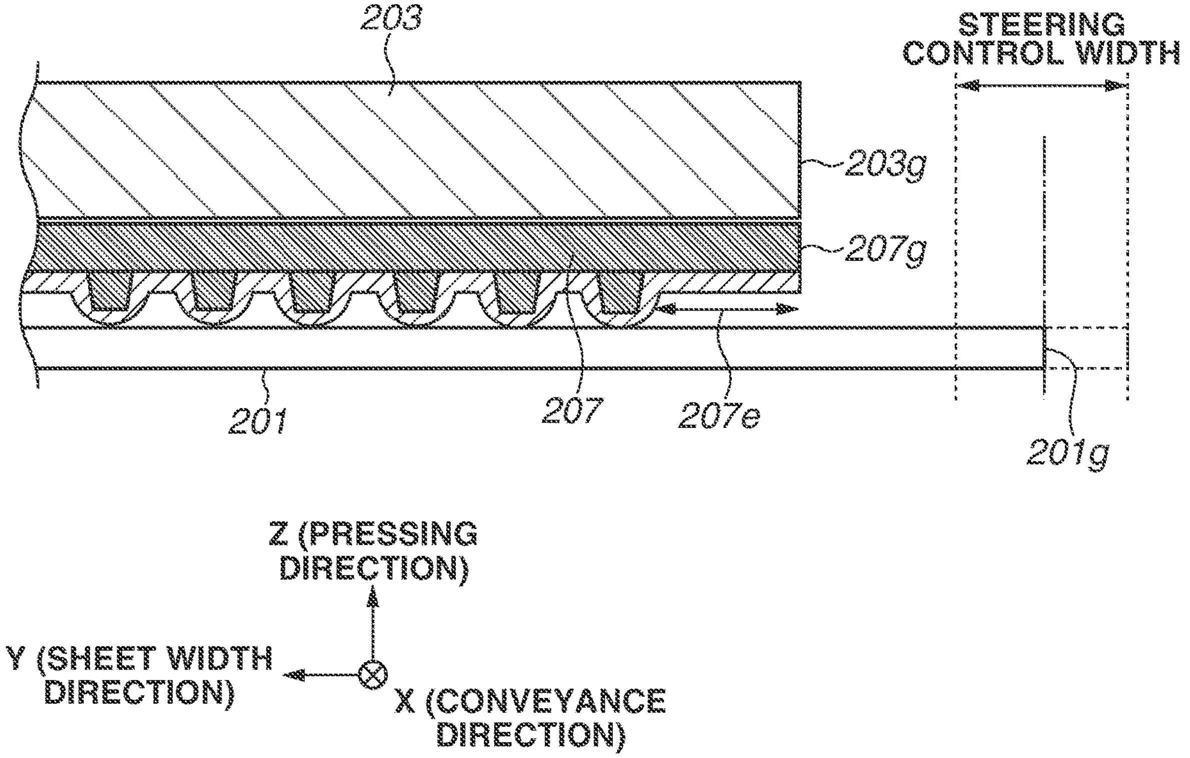
FIG. 8 is a diagram schematically illustrating a fixing nip portion including a slide member according to a modification example.

The position of the end portion 201*g* of the belt 201 in the width direction is changed by the steering roller 205. Even in a case where the position of the end portion 201*g* of the belt 201 is changed through the steering control, the end portion 201*g* of the belt 201 may be positioned outside an end portion 203*g* of the pad 203 and the end portion 207*g* of the slide member 207, as illustrated in FIG. 8 as a modification example. In this way, it is possible to prevent the oil S from adhering to the outer surface of the belt 201 by passing through the pad 203 and the slide member 207.

In the present exemplary embodiment, the slide member 207 is fixed to the stay 206 with screws or the like.

The areas into which the screws are inserted are provided on both end portions of the slide member 207 in the width direction. Thus, the length in the width direction including the slide member 207 and the areas into which the screws are inserted is longer than that of the belt 201. In another embodiment, the areas into which the screws are inserted may be located on both end portions in the conveyance direction, not limited to the both end portions in the width direction. In other words, the areas into which the screws are inserted are not included in the unembossed area 207*e*.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-028871, filed Feb. 28, 2022, which is hereby incorporated by reference herein in its entirety.

What is claimed is:

1. A fixing apparatus comprising:

a rotatable endless belt configured to apply heat to a recording material;

a steering roller, in contact with an inner circumferential surface of the rotatable endless belt, configured to change a position of the rotatable endless belt in a width direction of the rotatable endless belt by swinging;

a slide member, in contact with the inner circumferential surface of the rotatable endless belt, configured to slide onto the inner circumferential surface of the rotatable endless belt; and a pressing rotation member disposed to face the slide member via the rotatable endless belt, and configured to form a nip portion by pressing the rotatable endless belt, wherein the pressing rotation member is configured to fix a toner image onto the recording material by applying heat and pressure to an unfixed toner image in the nip portion, in cooperation with the rotatable endless belt, wherein the inner circumferential surface of the rotatable endless belt is configured to receive a lubricant applied onto the inner circumferential surface, and wherein an end portion of the rotatable endless belt on one end side in the width direction is configured to take a position outside an end portion of the slide member on the one end side and a position inside the end portion of the slide member on the one end side while the steering roller is in operation.

2. The fixing apparatus according to claim 1, wherein the slide member has an area with a plurality of protruding portions, and wherein the end portion of the rotatable endless belt on the one end side in the width direction is disposed outside an end portion of the area on the one end side while the steering roller is in operation.

3. The fixing apparatus according to claim 2, wherein the slide member has an unformed area with none of the plurality of protruding portions, outside the area in the width direction, and wherein the end portion of the rotatable endless belt on the one end side in the width direction is configured to take a position outside an end portion of the unformed area on the one end side and a position inside the end portion of the unformed area on the one end side while the steering roller is in operation.

4. The fixing apparatus according to claim 1, further comprising a pad member holding the slide member and configured to form the nip portion by nipping the rotatable endless belt in cooperation with the pressing rotation member.

5. The fixing apparatus according to claim 1, wherein the end portion of the rotatable endless belt on the one end side in the width direction is positioned outside an end portion of the pressing rotation member on the one end side while the steering roller is in operation.

6. The fixing apparatus according to claim 1, wherein the lubricant is oil.

7. The fixing apparatus according to claim 6, further comprising an oil application roller configured to apply the oil.

8. A fixing apparatus comprising:

a rotatable endless belt configured to apply heat to a recording material;

a steering roller, in contact with an inner circumferential surface of the rotatable endless belt, configured to change a position of the rotatable endless belt in a width direction of the rotatable endless belt by swinging;

a slide member, in contact with the inner circumferential surface of the rotatable endless belt, configured to slide onto the inner circumferential surface of the rotatable endless belt; and a pressing rotation member disposed to face the slide member via the rotatable endless belt, and configured to form a nip portion by pressing the rotatable endless belt, wherein the pressing rotation member is configured to fix a toner image onto the recording material by applying heat and pressure to an unfixed toner image in the nip portion, in cooperation with the rotatable endless belt, wherein the inner circumferential surface of the rotatable endless belt is configured to receive a lubricant applied onto the inner circumferential surface, and wherein an end portion of the rotatable endless belt on one end side in the width direction is positioned outside an end portion of the slide member on the one end side, regardless of an operation of the steering roller.

9. The fixing apparatus according to claim 8, wherein the slide member has an area with a plurality of protruding portions, and wherein the end portion of the rotatable endless belt on the one end side in the width direction is disposed outside an end portion of the area on the one end side, regardless of the operation of the steering roller.

10. The fixing apparatus according to claim 9, wherein the slide member has an unformed area with none of the plurality of protruding portions, outside the area in the width direction, and wherein the end portion of the belt on the one end side in the width direction is positioned outside an end portion of the unformed area on the one end side, regardless of the operation of the steering roller.

11. The fixing apparatus according to claim 8, further comprising a pad member holding the slide member and configured to form the nip portion by nipping the rotatable endless belt in cooperation with the pressing rotation member.

12. The fixing apparatus according to claim 8, wherein the end portion of the rotatable endless belt on the one end side in the width direction is positioned outside an end portion of the pressing rotation member on the one end side, regardless of the operation of the steering roller.

13. The fixing apparatus according to claim 8, wherein the lubricant is oil.

14. The fixing apparatus according to claim 13, further comprising an oil application roller configured to apply the oil.

* * * * *